US011488223B1

(12) United States Patent
Suprasadachandran Pillai et al.

(10) Patent No.: US 11,488,223 B1
(45) Date of Patent: Nov. 1, 2022

(54) MODIFICATION OF USER INTERFACE BASED ON DYNAMICALLY-RANKED PRODUCT ATTRIBUTES

(71) Applicant: Amazon Technologies, Inc., Seattle, WA (US)

(72) Inventors: Syama Prasad Suprasadachandran Pillai, Bangalore (IN); Vishal Mangesh Shanbhag, Bengaluru (IN); Sundar Rajan Ranganathan, Bangalore (IN); Anoop Putheth Balakrishnan, Bangalore (IN); Surya Vara Prasad Vishnubotla, Bangalore (IN)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/217,768

(22) Filed: Mar. 30, 2021

(51) Int. Cl.
| | |
|---|---|
| *G06Q 30/00* | (2012.01) |
| *G06Q 30/06* | (2012.01) |
| *G06Q 30/02* | (2012.01) |
| *G06F 16/248* | (2019.01) |
| *G06F 16/2457* | (2019.01) |
| *G06V 10/40* | (2022.01) |
| *G06V 30/10* | (2022.01) |

(52) U.S. Cl.
CPC ....... *G06Q 30/0627* (2013.01); *G06F 16/248* (2019.01); *G06F 16/24578* (2019.01); *G06Q 30/0204* (2013.01); *G06Q 30/0282* (2013.01); *G06Q 30/0631* (2013.01); *G06Q 30/0643* (2013.01); *G06V 10/40* (2022.01); *G06V 30/10* (2022.01)

(58) Field of Classification Search
None
See application file for complete search history.

(56) References Cited

U.S. PATENT DOCUMENTS

| | | | | |
|---|---|---|---|---|
| 10,497,039 | B1* | 12/2019 | Singh | G06F 16/248 |
| 2006/0064411 | A1* | 3/2006 | Gross | G06F 16/951 |
| 2009/0282013 | A1* | 11/2009 | Joshi | G06F 16/951 |
| | | | | 707/999.005 |
| 2011/0307411 | A1* | 12/2011 | Bolivar | G06F 16/9535 |
| | | | | 707/E17.084 |
| 2013/0067364 | A1* | 3/2013 | Berntson | G06F 16/951 |
| | | | | 707/723 |
| 2015/0161139 | A1* | 6/2015 | Wang | G06F 16/9535 |
| | | | | 707/735 |
| 2018/0196822 | A1* | 7/2018 | Lewin-Eytan | G06Q 10/107 |
| 2018/0342003 | A1* | 11/2018 | Siddiqui | G06Q 30/0627 |

\* cited by examiner

*Primary Examiner* — Mila Airapetian
(74) *Attorney, Agent, or Firm* — Klarquist Sparkman, LLP (57) ABSTRACT

A user interface (UI) feature assists users in comparing items and making purchase decisions. One or more attributes for results of a search query are dynamically identified and ranked for presentation within the UI so that a user easily compares products based on features of interest. Additionally, other content of the UI, such as product images, rankings, etc. are dynamically ranked based on the search query and/or user context and presented in an order of relevance so that the user quickly identifies information for making meaningful shopping decisions.

20 Claims, 9 Drawing Sheets

MODIFICATION OF USER INTERFACE BASED ON DYNAMICALLY-RANKED PRODUCT ATTRIBUTES

BACKGROUND

In online shopping, users may search for products and review results of product searches in a user interface. For example, responsive to a user's product search query, the online shopping merchants may provide a listing of products relating to the query. However, additional details of the products in the listing may not be accessible within the list. This approach places a burden on the user to navigate away from the search results each time the user desires to view details of interest for a respective product in the listing.

DETAILED DESCRIPTION

In some examples, users utilize a search functionality of an online merchant to find items that best fit their interests in a product or category of products. For example, a user provides a search query that indicates features of interest for a targeted product or category of products. Online merchants that offer search functionality provide, in some examples, a general listing of items corresponding to results of the search query. However, this listing typically includes a static presentation of some item details for each result of the search query. Product information of interest, which vary from user to user and from query to query are typically not be readily available in the item details provided on the search query, and the user struggles to find details of interest even after selecting a particular result for more information.

In order to increase the ease of locating relevant information for users of an online merchant, the disclosure provides mechanisms for modifying a user interface based on dynamically-identified and ranked product attributes. These modifications, in some examples, are presented on user interface pages such as a search results page that is presented responsive to a search query, a product detail page that is presented responsive to selection of a result of a search query (e.g., selection of a result included in the search results page), and/or other pages provided as a user interface for the online merchant. The attributes are dynamically-identified and ranked based on the search query (e.g., attributes determined to be associated with parameters of the search query), continuously-updated clustering information related to products corresponding to the search query, and/or user persona and/or intent (e.g., historical information relating to demographics of the user, shopping habits of the user, intent or stage of a current shopping mission for the user, etc.). A portion of the dynamically-selected attributes (e.g., a selected number of the highest ranking attributes) for a given search query are presented and highlighted for each result on a search results page, and additional dynamically-selected attributes are presented and highlighted for each selected result on a product detail page to enable a user to quickly locate relevant attributes and select a targeted product. Additional modifications based on the dynamically identified and ranked attributes include reordering images presented for results of a search query, reordering customer reviews, and/or otherwise adjusting the placement of information in search results and/or product detail pages or other pages presented during a search for items via a user interface of the online merchant.

Figure 1:
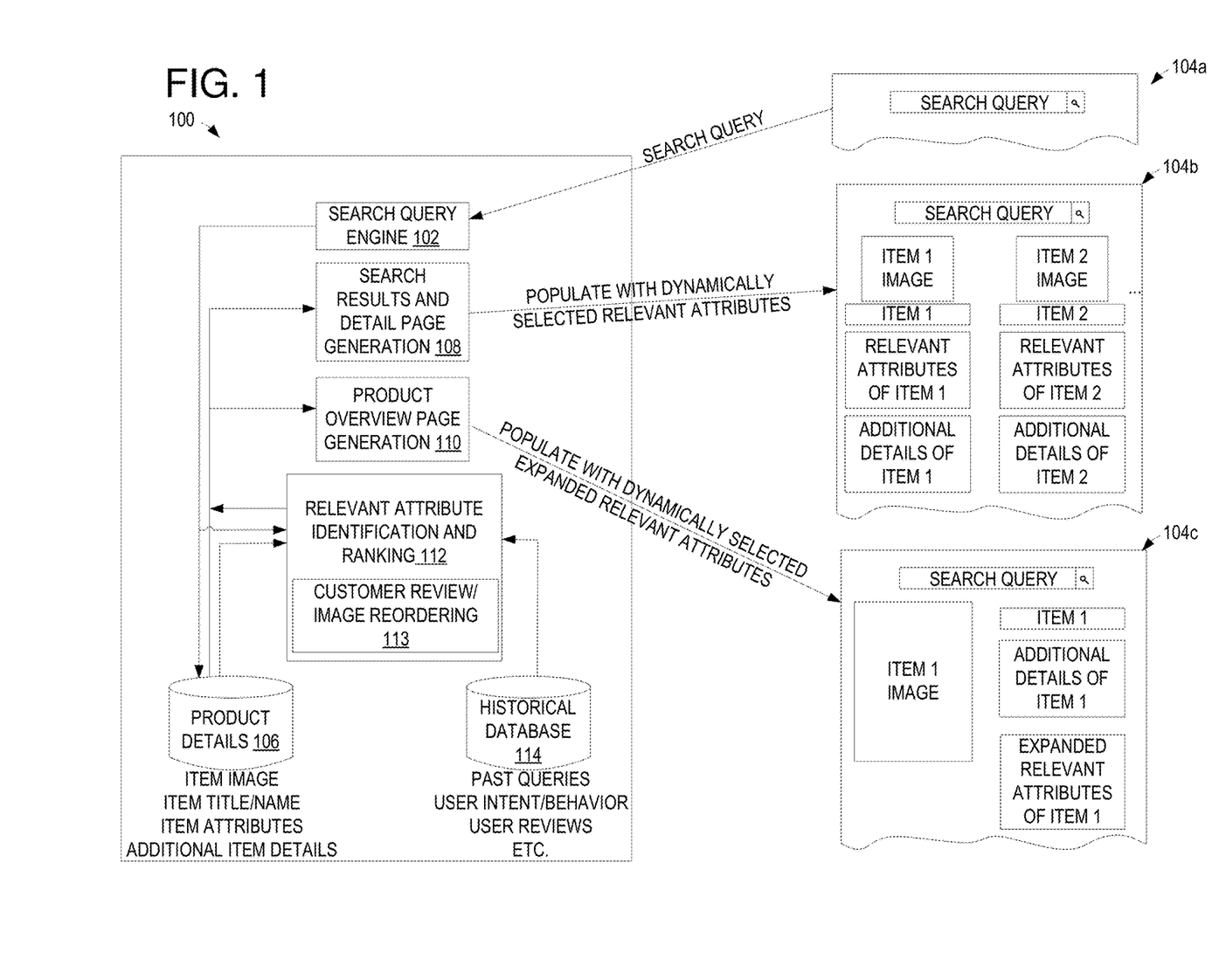
FIG. 1 schematically shows an example of an adjustment of displayed content based on a search query and dynamically-selected relevant attributes of products corresponding to the search query.

FIG. 1 schematically illustrates an example of an adjustment of displayed content based on a search query and dynamically-selected relevant attributes of products corresponding to the search query using a user interface modification system 100, which is implemented, in some examples, by an online merchant to populate a user interface. The user interface modification system 100 includes a search query engine 102 configured to receive search queries and process the search queries to determine results (e.g., products, which may include physical items, services, and/or other results, matching the search query) based on one or more search query processing algorithms. For example, the search query engine 102 receives a search query via user input to a search bar of a user interface 104a. In some examples, the user interface 104a corresponds to a portion of a user interface in a first state (e.g., when a user first provides a search query).

In some examples, item information for products provided by the online merchant, such as item images, item title/name, item attributes, and/or additional item details is stored in a product details database 106. The search query engine 102 provides an identification of products corresponding to results of the received search query to the product details database 106 to trigger product details of the results to be provided to various modules for the generation of user interface pages for presenting the results to the user. For example, a search results page, an example portion of which is shown at 104b, is generated by a search results and detail page generation module 108 and a product overview page, an example portion of which is shown at 104c, is generated by a product over page generation module 110. The search results and detail page includes plurality of user interface fields that are populated with results relating to a search query, whereas the product overview page includes a plurality of user interface fields that are populated with details for a selected product of the results. The product details for products that are presented in the search results and/or product overview pages for a given search query are thus provided from the product details database 106 to the respective generation modules 108 and 110 to populate the user interface fields accordingly.

As described above, the user interface fields include static fields that are the same for different search queries (e.g., item name, item rating, selected item details such as price, availability, etc.) and dynamically-modified attribute fields (e.g., "relevant attributes" in the user interface 104*b* and "expanded relevant attributes" in the user interface 104*c*) that are populated with structured attributes that are dynamically identified and ranked based on the search query and a current user context (e.g., a persona of the user and an intent of the user for a current shopping mission). As described above, in some examples, the item image presented is also adjusted and/or ordered differently based on the dynamically identified and ranked attributes.

In order to populate the dynamic fields, the search results and detail page generation module 108 and the product overview page generation module 110 receives relevant attribute information from a relevant attribute identification and ranking module 112. The relevant attribute identification and ranking module 112 receives and processes inputs from the search query engine 102 (e.g., used to indicate parameters of the search query), the product details database 106 (e.g., used to identify available attributes for results of the search query), and a historical database 114 (e.g., indicating past queries for a user, user intent/behaviors, user reviews, and/or other information) to identify and rank attributes that are most relevant to the user for a current search query. In this way, in some examples, the identified and ranked attributes from the relevant attribute identification and ranking module 112 are used to dynamically modify the user interface of the online merchant to highlight attributes of interest to assist a user in quickly finding products that meet the needs of the user.

Additional modifications to the user interface include, in some examples, reordering and/or highlighting other elements on the search results and detail page and/or the product overview page based on the identified relevant attributes. For example, a customer review/image reordering module 113 utilizes the identified relevant attributes to rank customer reviews, images, and/or other elements (e.g., customer questions and answers, etc.) of the user interface based on an association between the customer reviews/images/etc. and the identified relevant attributes. For example, images for a product are evaluated to determine attributes that are represented by and/or otherwise related to the images. The order in which images are displayed on the user interface (e.g., the selection of a first, or primary, image to represent a product and the selection of the navigable order of the remaining images for viewing additional features of a product) is determined to prioritize images that represent and/or are otherwise related to the identified relevant attributes (e.g., in accordance with the ranking of the identified relevant attributes by identification and ranking module 112). A similar process is used to rank, order for display, and/or highlight other elements of the user interface such as customer reviews, customer questions and answers, etc., as described in more detail below.

Figure 2:
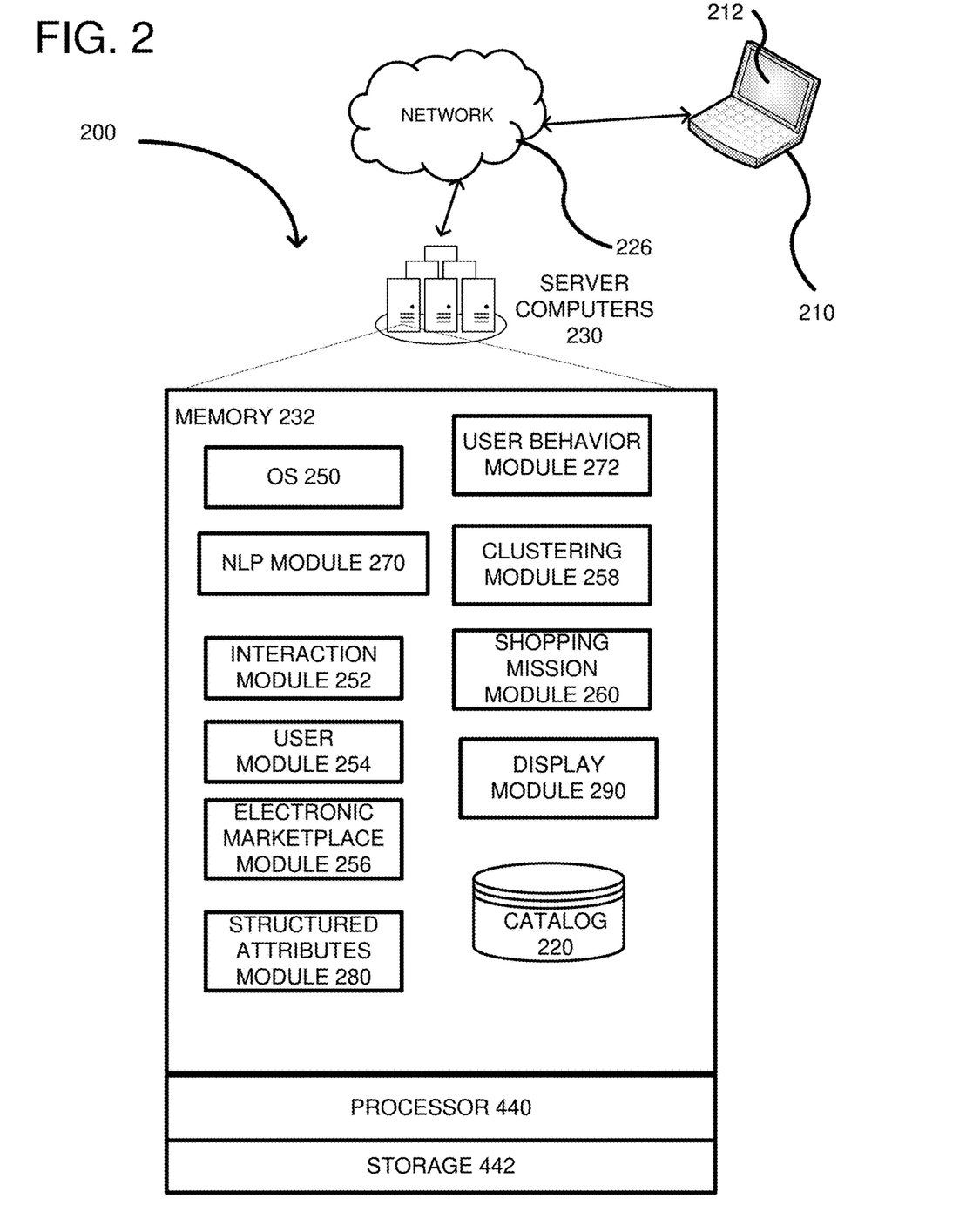
FIG. 2 shows a block diagram of an example system for identifying and ranking attributes of products and adjusting content that is presented to the customer based on the identified attributes.

FIG. 2 illustrates a system 200 for identifying and ranking structured attributes associated with products in a catalog. The system 200 allows one or more users to use computing devices, shown generally at 210, to use a browser (an application executing on the computer 210), which is shown generally at 212, to search a catalog 220 via one or more networks 226. The catalog 220 is provided by a marketplace provider, which includes one or more host server computers 230. The host server computers 230, in some examples, also associate one or more interactions with the cluster of interactions or a shopping mission, and provide content to one or more user devices 210 based on the associations.

The network 226 is any type and/or form of network and includes any of the following: a point-to-point network, a broadcast, local area or wide area network, a telecommunications or data communication network, a computer network, an ATM (Asynchronous Transfer Mode) network, a SDH (Synchronous Digital Hierarchy) network, a SONET (Synchronous Optical Network) network, a wireless network and a wired network. The network also includes a wireless link, such as a satellite band or an infrared channel. The topology of the network is a bus, star, or ring network topology.

The browser application 212 allows the client devices 210 to interact with the one of the server computers 230 within the marketplace provider to search the catalog 220. The application 212 provides access to any website that supports user interaction, including social networking sites, online retailers, informational sites, blog sites, search engine sites, news and entertainment sites, and the like. The client device 210 is any type of computing device such as, but not limited to, a mobile phone, a smart phone, a personal digital assistant (PDA), a laptop computer, a desktop computer, a thin-client device, a tablet PC, an electronic book (e-book) reader, etc.

In one illustrative configuration, the server computers 230 include at least one memory 232 and one or more processors 240. The processors 240 are implemented in hardware, computer-executable instructions, firmware, or combinations thereof. Computer-executable instruction or firmware implementations of the processor(s) 240 includes computer-executable or machine-executable instructions written in any suitable programming language to perform the various functions described.

The memory 232 stores program instructions that are loadable and executable on the processor(s) 240, as well as data generated during the execution of these programs. The memory 232 is volatile (such as RAM) and/or non-volatile (such as ROM, flash memory, etc.). Particular types of memory include SRAM, or DRAM. The server computers 230 include additional storage 242, which includes removable storage and/or non-removable storage. The additional storage 242 includes magnetic storage, optical disks, etc. The memory 232, the additional storage 242, both removable and non-removable, are all examples of computer-readable storage media. For example, computer-readable storage media includes volatile or non-volatile, removable or non-removable media implemented in any method or technology for storage of information such as computer-readable instructions, data structures, program modules, or other data. Additional types of computer storage media that are present in the server computers 230 include PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which is used to store the desired information and which is accessed by the server computers 230.

The memory 232 includes an operating system 250, the catalog 220 (which is located on one or more separate drives) and/or one or more application programs or services for implementing the features disclosed herein including one or more of an interaction module 252, a user module 254, electronic marketplace module 256, a clustering module 258, a shopping mission module 260, and/or a structured attributes module 280. The modules are software modules, hardware modules, or a combination thereof. If the modules are software modules, the modules are embodied as processor-executable instructions stored on a computer readable medium and processed by a processor in any of computer systems described herein. The interaction module 252 is programmed to determine or receive a history of interactions between a user and one or more network pages associated with an electronic marketplace. The history of interactions includes various information, including a time of an interaction, an item presented on at least one network page, an identification of the interaction performed, where a user clicked on a network page (e.g., using clickstream analysis, etc.), interactions performed by the user to view additional detail about an item or merchant, item information (e.g., description, title, image of an item, etc.), and the like. The interaction module 252 is also configured to determine a most recent event from the history of interactions based in part on the time of the interaction.

The user module 254 is programmed to determine data associated with a user or merchant that interacts with an electronic marketplace. This includes accessed network pages or items, name, location, items purchased or sold, and the like. The user module 254 is also configured to identify, update, or create a profile for a user that includes a user's state with respect to an identified shopping mission (e.g., complete/incomplete, low/high depth, etc.). The profile is used in part to determine which information about items are presented to the user through the electronic marketplace and/or is managed online.

The electronic marketplace module 256 is configured to enable one or more network pages for display. The network pages are configured to provide items, lists of items, search tools to find items, and tools to assist merchants in offering the items to users. The electronic marketplace includes a plurality of merchants that offer the item (e.g., the same item, different items, etc.) through the electronic marketplace.

The clustering module 258 is programmed to create or identify a cluster. The cluster includes one or more events associated with a user from the user's history of interactions. The cluster is limited to events that are of a same category as the most recent event, based in part on item attributes associated with the item presented on the at least one of the one or more network pages. The clustering module 258 also performs one or more of the following: associates one or more events with a cluster, associates an event with a cluster if the difference between the event and cluster is less than a threshold, instantiates a clustering process, or other performs other methods of associating an event with a cluster based in part on the similarities between the two.

The shopping mission module 260 analyzes an event associated with the cluster to form a mission associated with the cluster and whether the shopping mission is complete, ongoing, or incomplete (e.g., by looking at interactions associated with the shopping mission in chronological order, by determining whether the user will likely purchase an item associated with the shopping mission in the future using other users' interactions who participated in similar shopping missions in the past, etc.). The shopping mission module 260 determines content to provide to the user based at least in part on a state of the user with respect to the identified shopping mission, perform a hashing analysis, identify the shopping mission depth associated with the user, and determine a probabilistic model or predictive model (e.g., using a heuristic classification).

In some embodiments, a natural language processing (NLP) module 270 parses searches by a user and determine which part of the search terms are related to products in the catalog 220 and which terms are related to user-selectable product options that are positioned on detail pages of the product. For example, a search query of "running shoes, size 8" is parsed into "running shoes" and "size 8". The term "running shoes" is searched for in the catalog 220 and determined to be a category of products. The term "size 8" is searched in the catalog and determined to be on the detail pages of products wherein the detail pages include product options that a user selects. Thus, a determination is made when parsing a search, which terms match catalog categories and which terms match product options.

The user behavior module 272 uses the results of the NLP module 270 as one of its inputs to determine product search behavior for a user. As described above, the "size 8" parameter indicates a user behavior that assists in pre-selecting product options when the products are redisplayed. The term "product options" is meant to indicate that a user wanting to purchase a product has to select one of multiple available options to complete the purchase. The user behavior module 272 uses various inputs based on past shopping behavior to make pre-selection determinations for the user from the available product options. Thus, past search queries parsed by the NLP module 270 are one input. Other inputs include click patterns of the user on like attributes. Thus, if the user repeatedly selects "size 8" from the product options, then that is a behavioral characteristic that is used in pre-selecting product options in the future. Past purchase behavior is another potential input. Thus, product options that a user has selected in completed purchases is used to determine user behavior. For example, if the user previously purchased running shoes and selected size 8, then the previous selection of like product options is an indicator of future selections. Still further, the user provides explicit preferences that should be pre-selected. For example, if the user always selects size 8, then the user enters their preferences for preselection to their account.

A structured attributes module 280 obtains product-related attributes, as well as information from other modules such as the results of the NLP module 270 and/or the user behavior module 272, and provides a dynamic identification and ranking of relevant attributes relating to a search query. As one example, if the search query for a shoe includes a shoe size and color, then the dynamically-selected structured attributes also includes sizes and colors of shoes included in results of the search query, and these dynamically-selected structured attributes are transmitted to a display module 290 that generates the display of a customized webpage for display on the client device 210. Other structured attributes are likewise gathered and used for display. The structured attributes include attributes that do not have user-selectable options.

Figure 3:
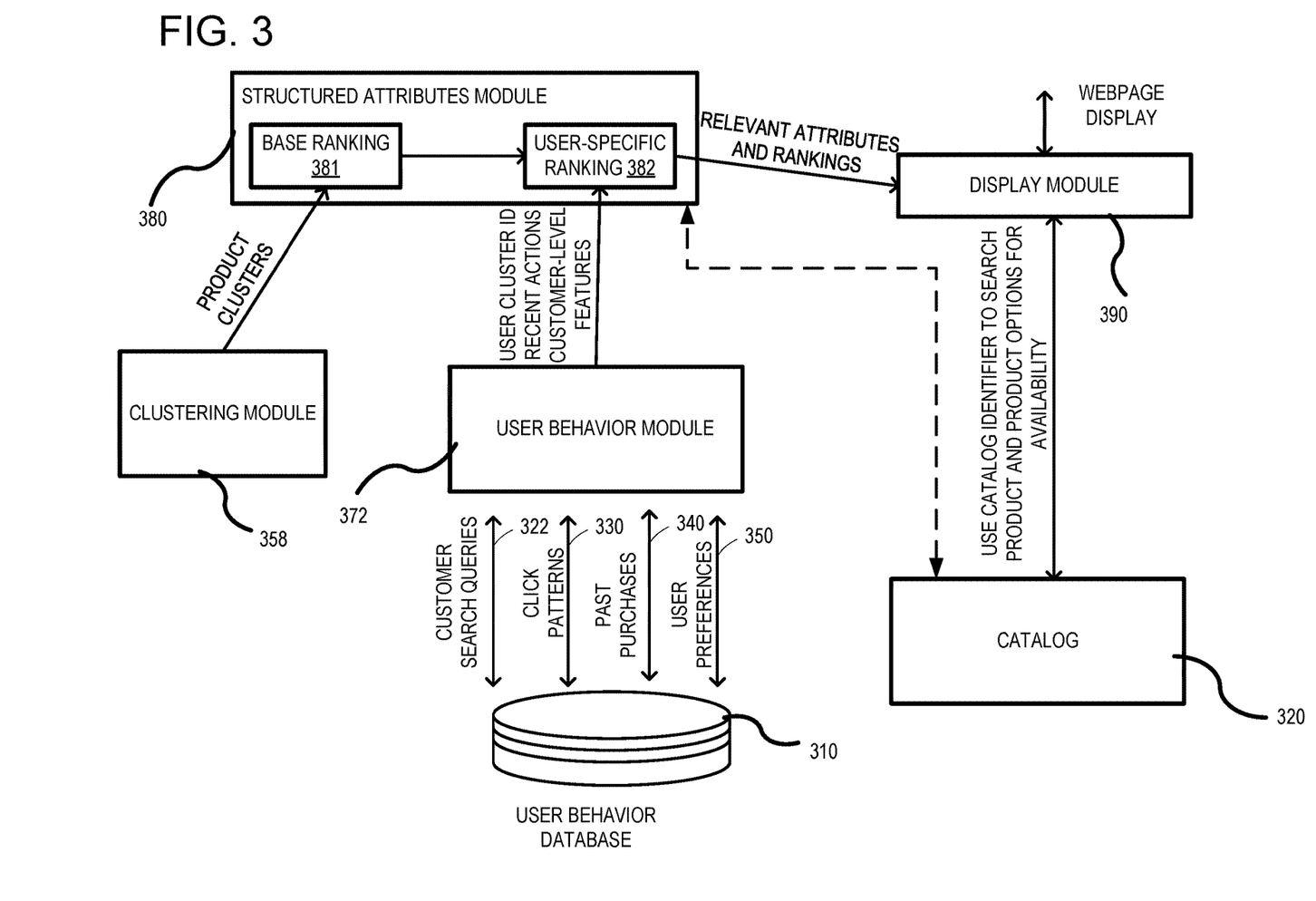
FIG. 3 is an example system diagram for implementing the user interface described herein.

FIG. 3 shows further details of the interactions between the modules of FIG. 2. The clustering module 358 is coupled to the structured attributes module 380 and provides identifiers of products for one or more particular clusters, such as clusters that are relevant to a current search query. The identifiers are used by a base ranking module 381 of the structured attributes module to retrieve products and associated attributes from the catalog 320 and to determine base rankings for the attributes of the products in the product clusters. In order to generate the base ranking, the structured attributes module 380 utilize, in some examples, a natural language pipeline that, for a given product type and marketplace (e.g., scope of the search query) performs a series of processing operations. The processing operations include fetching data from relevant signals such as past customer search queries, customer reviews, customer questions and answers, universal external catalog data, free text catalog attributes like product description and title for that scope, etc. In order to facilitate the processing of the text, all of the text is aggregated into one text file in one example. A domain-specific word embedding model(s) (e.g., a Word2Vec model) is trained on the above-described data corpus, which identified n-dimensional numerical feature vectors against each word, and then groups similar words into category specific concepts (e.g., clusters of semantically similar words). For example, "green" and "red" are semantically grouped as a "concept" called "color," whereas "green" and "book" are not grouped as being similar. The operations further include fetching all catalog structured attributes (e.g., size, in the above shoe search example) and the corresponding enumerated values (e.g., "8" in the above shoe search example) and measures distance of identified concepts from attributes and/or values. The operations further include clearing out noise (e.g., irrelevant concepts), calculating number of words in each concept, then normalizing this number to a score. Increased numbers of words in a concept are considered to correspond to increased relevancy of the concept. The base ranking is thus based on this evaluation of the concepts.

After identification of relevant attributes, the output is subject to manual curation in some examples. The manual curation involves manually reviewing relevant attributes for a scope and removing attributes that do not conform to understood relationships between attributes and products, based on rudimentary knowledge of the domain in question. The base rankings are continuously re-ranked based on feedback from customers using online re-ranking algorithms such as bubble ranking in some examples. In some examples, the bubble ranking is used to randomize the order of attributes shown to a small set of customers to check which order of attributes results in the best conversion rates to generate new optimal rankings that are used as updated base rankings.

Customer embeddings are n-dimensional numerical vectors describing customer personas (e.g., features about customers) based on past customer purchases, search queries, product clicks, etc., and group semantically similar customers into clusters referred to as customer sets. For each customer set, different randomized orders of identified relevant attributes are provided to identify which order results in best conversion rate for that customer set. The results of this test are used by a user-specific ranking module 382 to dynamically rank attributes for customers that are identified as belonging to that customer set for future search queries. Accordingly, in some examples, the user-specific ranking module 382 re-ranks the attributes ranked by the base ranking module 381 in light of the user cluster to which the user belongs.

For example, the user behavior module 372 stores and retrieves user data from a database 310, wherein the user data is associated with past searches, in order to interpret user behavior and determine relevant attributes and associated rankings based on past selected options. For example, past user search queries 322 are parsed to determine candidate attributes that are likely to be highly relevant (e.g., ranked higher than other attributes) to a user when terms in the search queries match one of candidate attributes. Click patterns 330 are input into the user behavior module 372. The click patterns are associated with prior searches and how the user interacted with detail pages (sub-pages) associated with the product. In particular, if the user previously clicked on user-selectable options, such as where a user clicked on one of multiple potential options (e.g., size, shape, color, organic, model, etc.) associated with a single product, then such a click history is used to determine relevant attributes associated with products being actively displayed. Past purchases 340 are related to how the user selected user-selectable options in the past purchases. Such previous user-selected options are used to pre-select similar options for products currently being displayed and to identify attributes that are present across multiple purchases, which are determined to be relevant to the user. Finally, user preferences 350 are explicit preferences provided by the user that are stored in database 310. The user preferences 350 are selected by the user to indicate attributes of interest to the user. In some examples, such user-selected attributes are compared against attributes relating to a current search query to determine relevant attributes for that search query based on the user preferences. Using any one or a combination of these indications of user behavior/persona 322, 330, 340, 350, the user behavior module 372 provides an identification of a user cluster to which the user belong (e.g., a cluster of users having similar behaviors and/or a similar persona), an indication of recent actions of the user, and/or other customer-level features to the structured attributes module 380 to identify and rank relevant attributes for the user as described above.

The display module 390 retrieves the dynamically-selected structured attributes from the structured attributes module 380. For example, as described above, the structured attributes module 380 identifies relevant structured attributes that are relevant based on various input signals (e.g., parameters of the search query, user persona/intent, etc.), ranks the relevant structured attributes via an offline ranking algorithm (e.g., to generate a base ranking of the attributes using the base ranking module 381), and then re-ranks the identified attributes via an online explore-exploit solution (e.g., a multi-armed bandits approach and/or other approaching using the user ranking module 382) to optimize the rankings for the given user based on the user's persona and intent.

The structured attributes module, in some examples, also includes processing algorithms for reranking and/or re-ordering images in image blocks of user interface pages. For example, products in a catalog have one or more images representing various attributes of the product (e.g., color, dimension, brand, etc.). A product detail page has limited area to display images, and thus the sorting of image is useful to reduce the time to understand the most important features of the product (e.g. reduce click through time to see quality of item or full look of item, etc.), and to reduce inadvertent purchases (e.g., based on incorrectly perceived dimensions). An example of ranking images includes attaching manual attributes to each image during an image onboarding process (e.g., a person attaches relevant attributes visible in the product image when adding the image to a catalog database). Attributes of the product image are identified using image classification models to generate image embeddings, which include a numerical vector that represents various attributes of the image. This is created using an unsupervised neural network or similar model. Textual information from the images is extracted using optical character recognition technology and mapped to closes concepts (e.g., the concepts described above). The images are ranked based on the concepts presented in the images and the rankings of those concepts. As a detailed illustrative example, images of a product are subjected to optical character recognition to extract textual information such as a flavor, brand, weight, ingredients, and/or other details of a product corresponding to the image. The ranked relevant attributes for the product in this example are brand, ingredients, and weight, etc., with brand having a highest ranking. Since brand is identified to be the top most relevant attribute and then ingredients, an image of the product that shows a brand is ranked higher than an image of the product that shows ingredients (and not brand), thus the image showing the brand is shown first on a product detail and/or search results page.

In additional or alternative examples, the structured attributes module 380 also includes algorithms for selecting and/or ranking/ordering other information that is to be displayed in a search query results page, product overview page, and/or other webpage for the online merchant. For example, as described above, examples of other information that is selected/re-ranked based on relevant attributes for a user and associated search query include customer reviews and/or customer questions and answers. In some examples, content of the customer reviews and/or customer questions and answers is extracted and processed in order to associate each review and/or question/answer with one or more corresponding attributes. As a non-limiting example, key words are associated with possible attributes, such that customer reviews and/or questions/answers that include selected key words are recognized as being associated with the corresponding attribute(s). Similarly to the mechanisms described above for re-ordering images, the reviews and/or questions/answers are re-ordered based on respective associations to attributes identified as relevant (e.g., by the base ranking module 381 and/or the user-specific ranking module 382). For example, reviews and/or questions/answers that are determined to be associated with a most relevant attribute for a user and current search query are displayed more prominently than reviews and/or questions/answers that are not determined to be associated with any relevant attribute or with a lower-ranked relevant attribute. In some examples, up to a predetermined threshold number of highest ranking reviews and/or questions/answers are displayed in a corresponding portion of a user interface (e.g., where the user interface includes a selectable element that is selectable to view additional, lower-ranked reviews/answers).

The various inputs from the structured attributes model 380, the user behavior model 372, the clustering module 358, and the catalog 320 are used by the display module 390 to generate a webpage for display to a user. For example, if the user clicks on a UI element such as an item name or image in the search results window of FIG. 4 (described in more detail below), the display module 390 makes a request to each of the modules 358, 372, 380 to obtain the data used to generate and display a webpage, such as is shown in FIG. 5. In some examples, the product clusters and/or identifiers of the products in the clusters from the clustering module 358 are provided to the display module 390 for retrieval of products and associated details from the catalog 320 for display. In this way, the catalog 320 provides data, such as product details, for generating and displaying a webpage via the display module 390 based on the identified products relating to the current search query, and the structured attribute module provides data, such as relevant attribute identification and ranking, for selecting and arranging the data from the catalog for display in the webpage via the display module 390.

Figure 4:
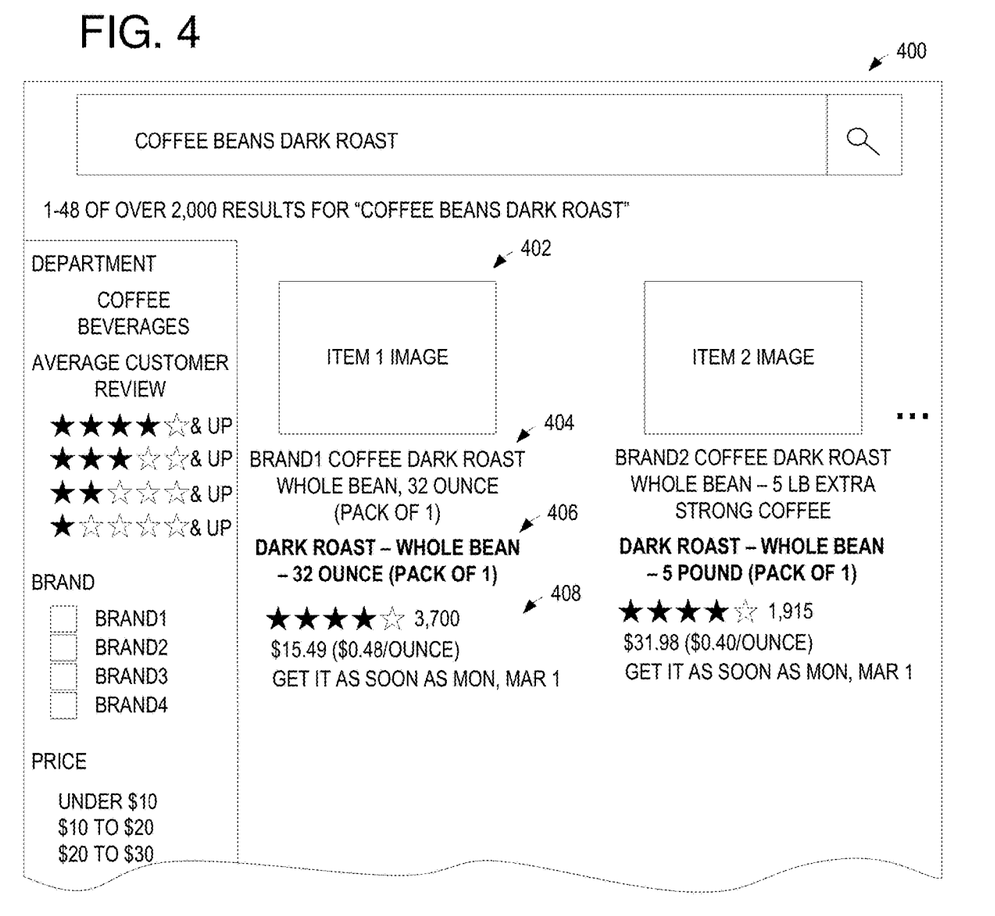
FIG. 4 shows an example portion of a user interface presenting results of a search query displayed with dynamically-selected relevant attributes.

FIG. 4 shows an example portion of a user interface 400 for a search results page corresponding to a search query for "coffee beans dark roast." As shown, the search results page includes populatable fields for each result of the search, including an image field 402, a title field 404, a dynamic attributes field 406, and additional details field 408. As described above, the image field 402 and/or the dynamic attributes field 406 are dynamically populated with information for an associated result of the search query (e.g., corresponding product information for item 1 of the search results in the illustrated example) based on the dynamic identification and ranking of relevant attributes described above with respect to FIGS. 1-3. For example, based on the search query, which included a specification of a type of roast for the coffee, the roast style of each search query result is provided in dynamic attributes field 406. Searches for coffee also, in some examples, have a base attribute ranking that identifies sizing/weight of the coffee as a high ranking attribute, so this attribute is also included in the dynamic attributes field 406. The item 1 image shown in image field 402 for the first search result is selected based on rankings of the images in light of the dynamically identified and ranked attributes as described above with respect to FIG. 3.

Figure 5A:
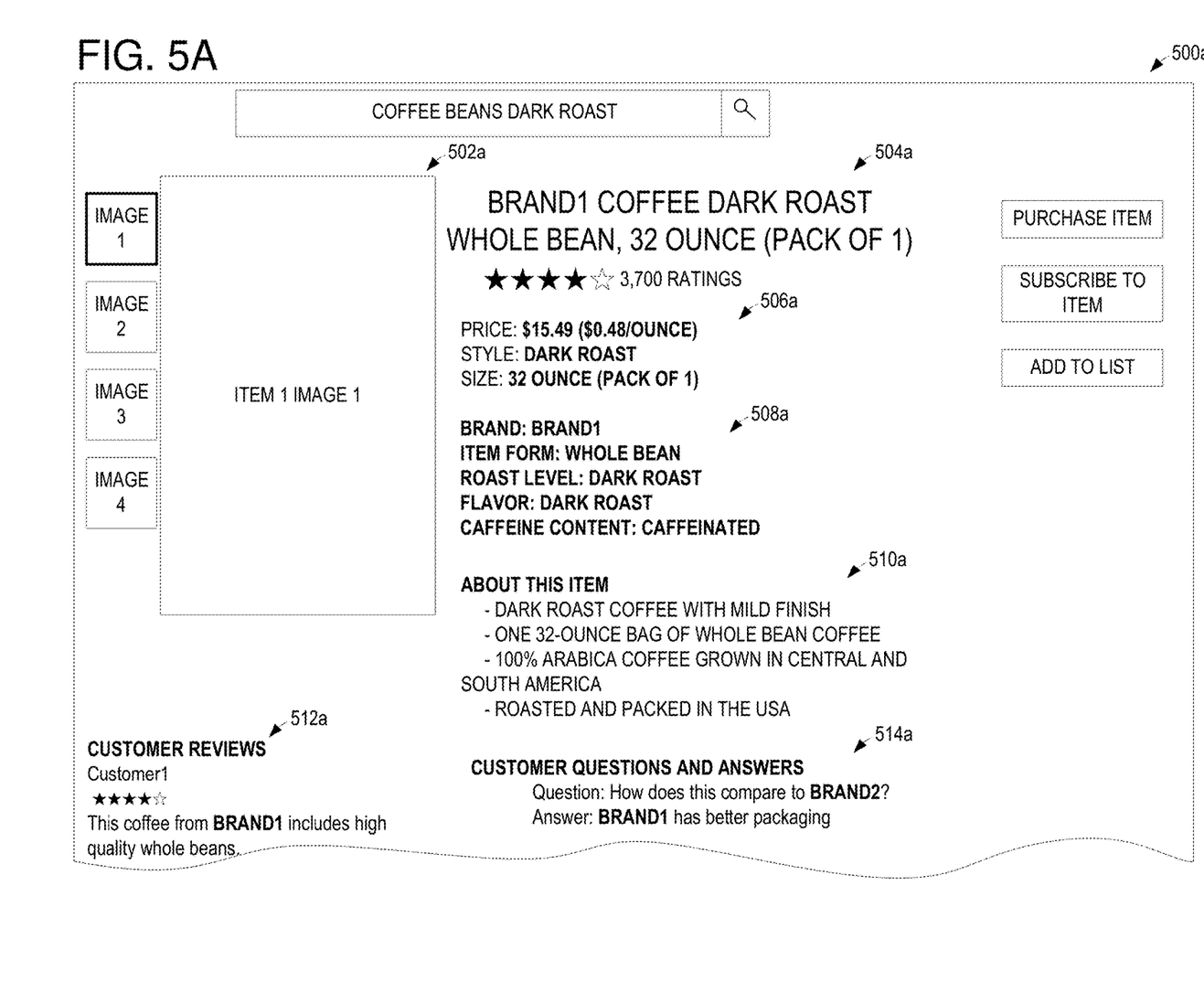
FIGS. 5A and 5B show different views of an example portion of a user interface presenting a product detail page for a product selected from the user interface of FIG. 4 in which dynamically-selected relevant attributes for the product are displayed for a first user (FIG. 5A) and a second user (FIG. 5B).
Figure 5B:
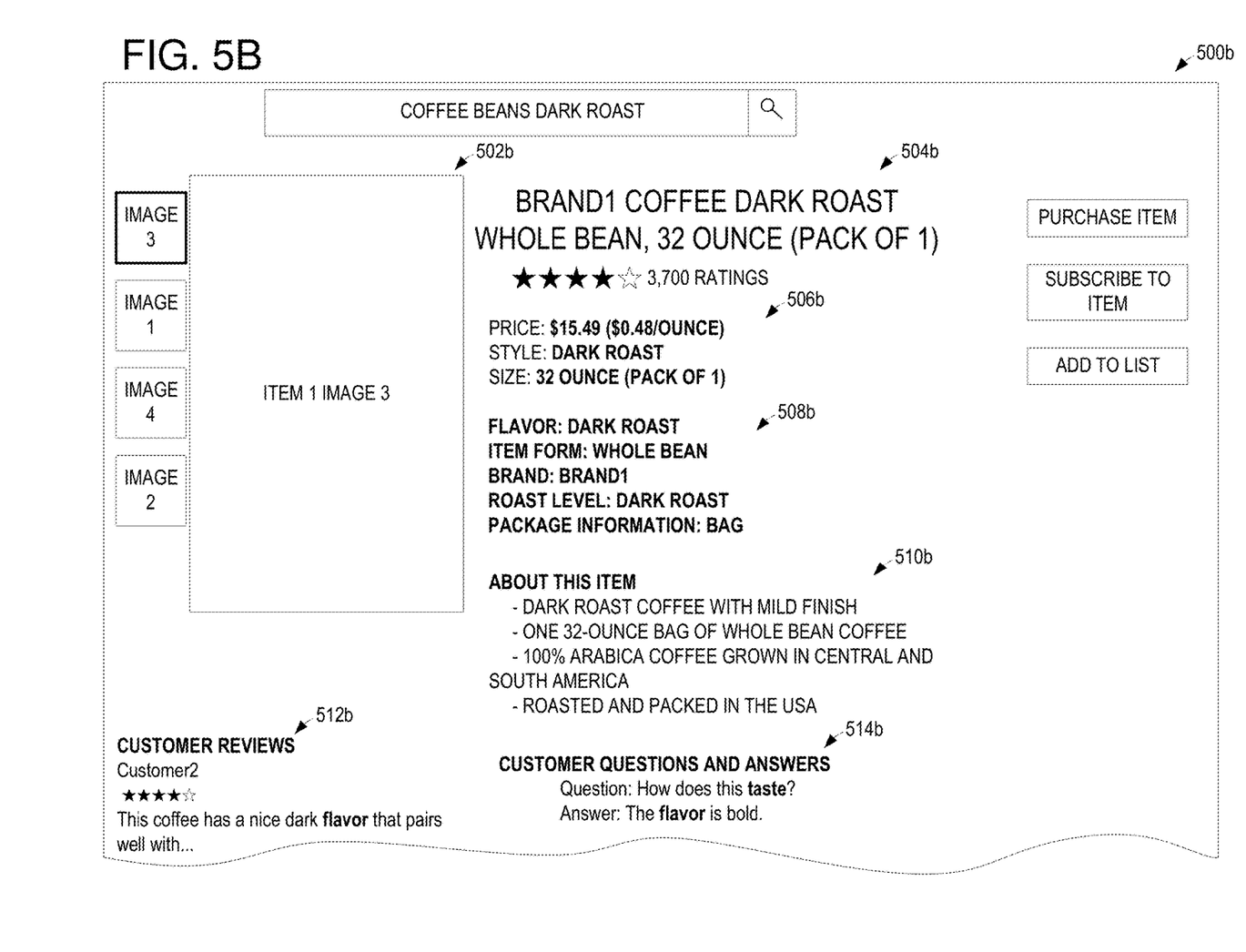

FIGS. 5A and 5B show example portions of a user interface 500 for a product overview page corresponding to a selected result of the search query (e.g., a result presented in a search results page, such as page 400 of FIG. 4), which are respectively customized for presentation to different users. For example, user interface 500a is configured for presentation to a first user responsive to a search query and selection of a product and user interface 500b is configured for presentation to a second user responsive to the same search query and selection of the same product. As only one result is shown, the product overview page is able to display additional images and attributes for the selected product relative to the results page of FIG. 4. Each product overview page 500a and 500b includes a respective image field 502, title field 504, product details field 506, expanded dynamic attributes field 508, additional details field 510, customer reviews field 512, and questions and answers field 514. The image field 502 includes multiple images, which are ordered according to the dynamic ranking of attributes associated with the images as described in more detail with respect to FIG. 3. The title field 504, product details field 506, and additional details field 510 are, in some examples, statically populated with information corresponding to the product (e.g., regardless of details of the search query and/or user persona/intent), whereas the expanded dynamic attributes field 508 shows dynamically identified and ranked attributes for the product based on the search query and the user persona and/or intent and the customer reviews field 512 and questions and answers field 514 show dynamically selected and/or highlighted customer reviews and/or questions/answers that relate to the dynamically identified and ranked attributes. The dynamic attributes field 508 enables attributes of importance to the user to be extracted and/or copied from other areas of the product overview page and brought toward the top of the product overview page for ease of identification of attributes that are identified as being most relevant to the user. In some examples, the dynamic attributes shown in FIGS. 4 and 5 are highlighted (e.g., presented in bold, highlighted, differently colored, or otherwise augmented text) for ease of detection. The expanded dynamic attributes field 508 shows additional dynamically identified attributes in relation to the truncated dynamically identified attributes shown in the search results page of FIG. 4, due to the increased space for this information in the product overview page.

As described above, while some information on the respective user interfaces remains the same for different users, other portions of the user interfaces include different content and/or are positioned differently for each user, based on the user persona and the associated identification and ranking of relevant attributes for that user. In this way, the content and/or appearance of content presented responsive to the same search query string is different for each user in order to tailor the results and/or product overview pages to each user. For example, the search query "coffee beans dark roast" is identified as being associated with a product cluster of coffee beans that has a base ranking of relevant attributes, such as brand, caffeine content, item form, flavor, roast level, packaging type, etc. across all user personas. However, in order to assist each user in quickly locating the most relevant attributes for that user, the user interfaces 500a and 500b of FIGS. 5A and 5B, respectively, are rearranged to show relevant attributes in a different order that is selected based on the user behavior and/or persona of the user that made the search query. For example, the user interface 500a reorders the relevant attributes in field 508 to prioritize brand and item form over other attributes due to a determination of the level of relevancy of these attributes to the first user and/or users having a similar persona to the first user (e.g., using a user ranking algorithm as described above with respect to FIG. 3). As an illustrative example, previous purchases of the first user include different flavors of coffee, however, are primarily from the same brand and have the same item form, indicating an importance of the brand and item form over other attributes for that user. In contrast, as another illustrative example, previous purchases of the second user include different brands of coffee, however, the second user typically purchases from a select group of flavors and often searches user reviews for discussions of flavor. Accordingly, as shown in FIG. 5B, the attribute "flavor" is presented in a primary position in field 508b for the second user (in contrast to "brand" for the first user in field 508a of FIG. 5A). The remaining attributes are also ordered differently and/or include different content between the two users. For example, the first user is presented details for attributes in field 508a that include caffeine content, while the second user is instead presented details for package information. As described above, the differences in the selection and ordering of the attributes in field 508 between FIGS. 5A and 5B are based on the differences in user behaviors/personas for the first and second users.

As discussed above, other fields, such as the respective image fields 502, customer review fields 512, and customer questions and answers fields 514, are also reordered and/or populated with different content based on the user and associated relevant attributes and attribute rankings. For example, the primary image shown for the first user in user interface 500a is image 1, whereas the primary image shown for the second user in user interface 500b is image 3. The thumbnail images are also reordered in the different user interfaces. As described in more detail above with respect to FIG. 3, the images are reordered for each user based on the ranking of attributes for the users and the attributes determined to be represented by the images (e.g., where images representing the most and/or highest ranked attributes are presented first in the ordered groupings). The customer reviews and questions and answered fields are also customized for each user; for example, reviews and questions relating to brand are shown first in user interface 500a due to the relevancy of the brand attribute to the first user, and reviews and questions relating to flavor are shown first in user interface 500b due to the relevancy of the flavor attribute to the second user. In this way, the number, content, and/or ordering of the content in each of the dynamically modifiable portions of the user interface (e.g., the image field 502, the attributes field 508, the reviews field 512, and the questions and answers field 514) is adjusted based on the user providing the search query (and the user's associated behavior and/or persona).

Figure 6:
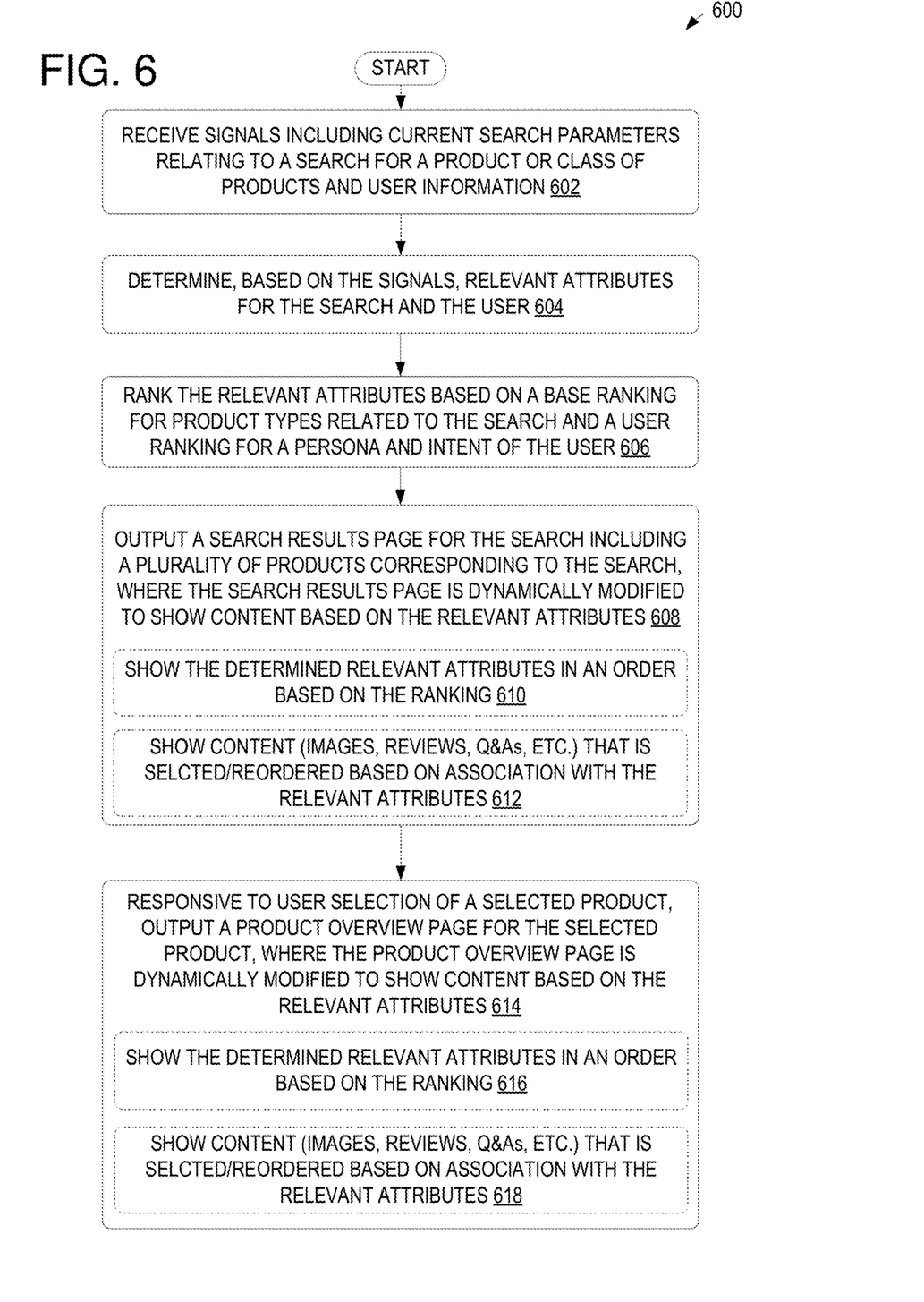
FIG. 6 is a flow chart of an example method for dynamically identifying and ranking relevant attributes for search query results and displaying at least a portion of the relevant attributes with the search query results.

FIG. 6 is a flow chart of an example method 600 for dynamically identifying and ranking attributes and modifying a user interface based on the attributes. The method 600 is performed by a computing system, such as the systems of FIGS. 1-3 to present a modified user interface, examples of which are shown in FIGS. 4, 5A, and 5B. At 602, the method includes receiving signals including current search parameters relating to a search for a product or class of products and user information.

At 604, the method includes determining, based on the signals, relevant attributes for the search and the user. For example, the relevant attributes are identified based on parameters of the search query (e.g., based on a natural language processing of the text of the search query), base rankings (described in more detail below) of a product category or categories relating to the search query, and/or user context such as a user persona (e.g., a customer cluster in which the user is included) and/or user intent (e.g., a stage of a current shopping mission of the user).

At 606, the method includes ranking the relevant attributes based on a base ranking for product types related to the search and a user ranking for a persona and intent of the user. Examples of performing the base and user ranking (e.g., re-ranking) are described above in more detail with respect to FIG. 3. At 608, the method includes outputting a search results page for the search including a plurality of products corresponding to the search. As indicated, the search results page is dynamically modified to show at least a portion of the determined relevant attributes and/or content that is selected and/or re-ordered based on association with the determined relevant attributes. For example, as shown in FIG. 4, the search results page shows a top relevant attribute or a predetermined top number of relevant attributes for each result of the search query so that the user can view these top relevant attributes at a glance. As indicated at 610, the determined relevant attributes are shown in an order based on the ranking (e.g., a top ranked attribute is shown first, before lower ranked attributes). As indicated at 612, in some examples, content, such as images, reviews, questions and answers, etc., is selected for display and/or reordered in the user interface based on respective associations of the content with the determined relevant attributes.

At 614, the method includes, responsive to user selection of a selected product (e.g., in the search results page output at 608), outputting a product overview page for the selected product, where the product overview page is dynamically modified to show the determined relevant attributes. For example, as shown in FIG. 5, the product overview page shows expanded relevant attributes at a top of the page so that these attributes are easier for the user to find (e.g., compared to a page that distributes these attributes throughout the full description of the product on the product overview page). As indicated at 614, the determined relevant attributes are shown in an order based on the ranking. As indicated at 616, in some examples, content, such as images, reviews, questions and answers, etc., is selected for display and/or reordered in the user interface based on respective associations of the content with the determined relevant attributes.

Figure 7:
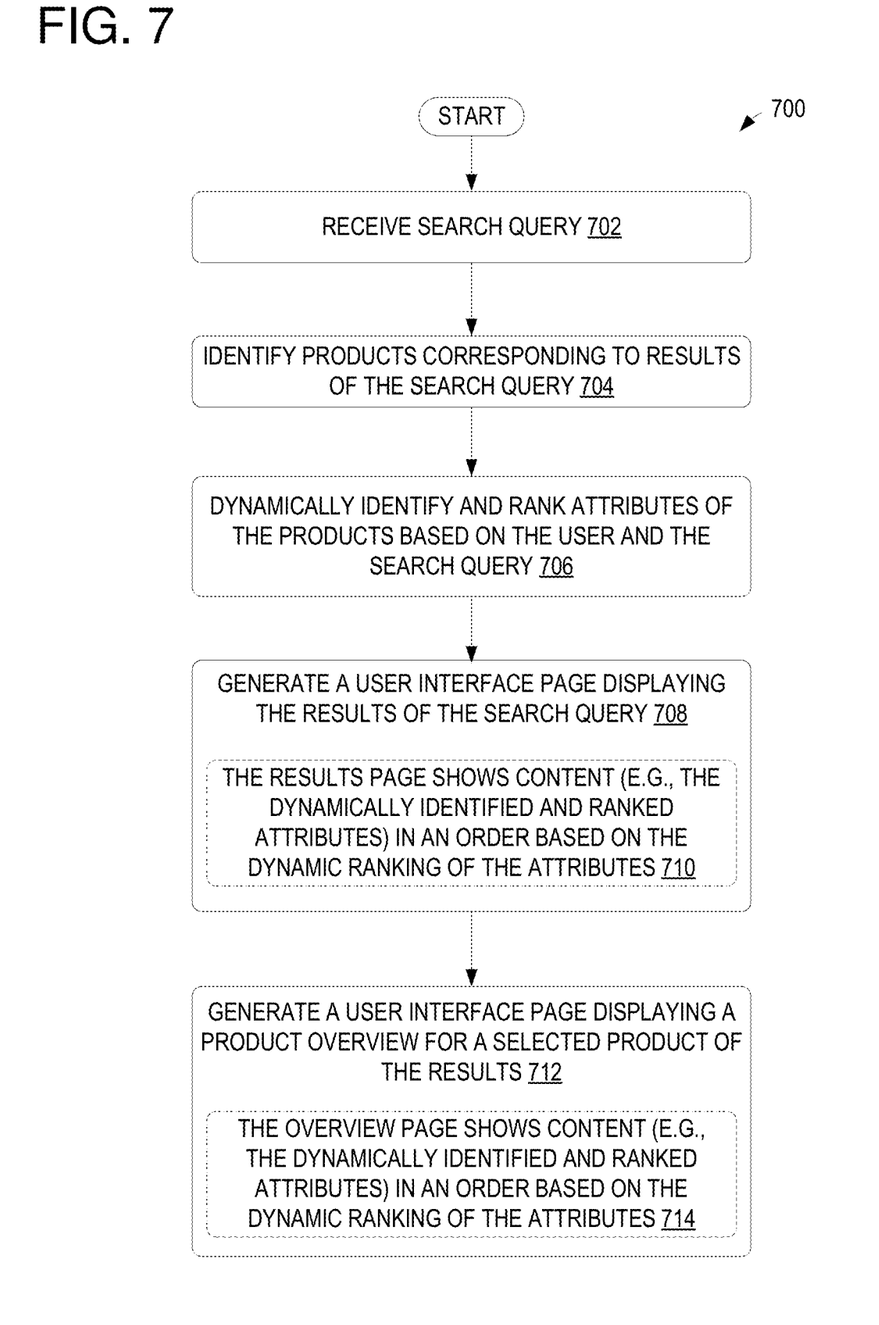
FIG. 7 is a flow chart of an example method for generating user interface pages based on dynamically identified and ranked relevant attributes for search query results.

FIG. 7 is a flow chart of an example method 700 for generating user interface pages based on dynamically identified and ranked relevant attributes for search query results.

The method 700 is performed by a computing system, such as the systems of FIGS. 1-3 to present a modified user interface, examples of which are shown in FIGS. 4, 5A, and 5B. At 702, the method includes receiving a search query. In some examples, the search query is received from a user via a user interface (e.g., a search query page of a user interface for an online merchant).

At 704, the method includes identifying products corresponding to results of the search query. As described in more detail above with respect to FIGS. 1-3, search queries are processed and details of products or other items corresponding to results of the search query are retrieved from a catalog, such as catalog 220 of FIG. 2.

At 706, the method includes dynamically identifying and ranking attributes of the products based on the user (e.g., an identity of the user) and the search query (e.g., parameters and/or text of the search query). For example, as described in more detail above, relevant attributes for the products in the result are identified and have a base ranking based on product clusters to which the products belong. The ranking of the attributes is then re-ranked in some examples based on user information such as a user cluster to which a user belongs, which is determined based on a user persona and/or user behavior (e.g., demographic information associated with the user such as location, age, education, economic/financial status, race, gender, etc., the user's past interactions with the online shopping user interface, etc.).

In order to tailor the search results and related presentation of the search results to the user and the search query, in some examples an order and/or placement of the identified and ranked attributes of the products in pages of a user interface (e.g., pages associated with the search query page in which the user enters the search query) are adjusted based on the identification and ranking of relevant attributes. Examples of two pages that are modified to present the identified and ranked attributes are described below, and it is to be understood that in some examples only one of the described pages are generated, in other examples both of the described pages are generated, and in still other examples one or more different pages are generated that include the identified and ranked attributes.

For example, at 708, the method includes generating a user interface page displaying the results of the search query. For example, the products and at least a portion of the associated product details for products identified as results of the search query at 704 are shown as a results user interface page, where each product includes a selectable product user interface element described in more detail below. As indicated at 710, the results page shows content (e.g., at least a portion of the dynamically identified and ranked attributes and/or other content such as images, customer reviews, questions/answers about the product, etc.) in an order that is based on the dynamic ranking of the attributes identified for the user at 706. In this way, in some examples, the results page for different users will display different content and/or content in a different order from one another (e.g., when the users belong to different user clusters, as described above).

At 712, the method includes generating a user interface page displaying a product overview for a selected product of the results (e.g., responsive to selection of a product user interface element corresponding to the selected product, which is shown in the results interface page generated at 708). As indicated at 714, the product overview page also shows content (e.g., at least a portion of the dynamically identified and ranked attributes and/or other content such as images, customer reviews, questions/answers about the product, etc.) in an order that is based on the dynamic ranking of the attributes identified for the user at 706. In this way, in some examples, the product overview page for different users will also display different content and/or content in a different order from one another (e.g., when the users belong to different user clusters, as described above).

Figure 8:
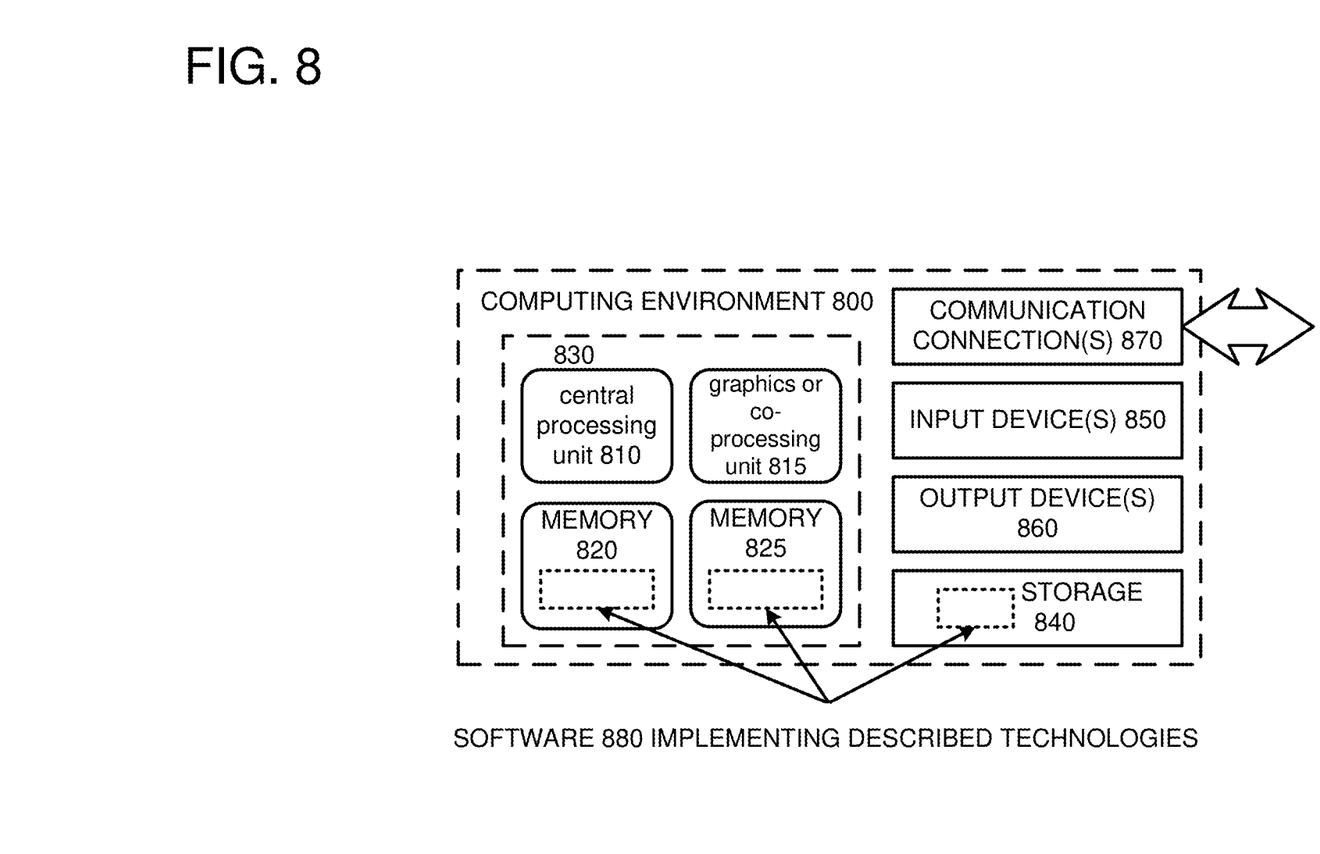
FIG. 8 depicts a generalized example of a suitable computing environment in which the described innovations may be implemented.

FIG. 8 depicts a generalized example of a suitable computing environment 800 in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, etc.).

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing environment 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A method of displaying content including dynamically-identified and ranked attributes, the method comprising:

receiving signals including search parameters of a current search query and user information;

determining, based on the signals, relevant attributes for the search and the user;

ranking, based on the signals, the relevant attributes for the search and the user, the ranking being based at least in part on a user cluster in which the user is determined to be included based on the user information;

outputting data for displaying a search results page via a user interface including a plurality of products corresponding to the search, wherein the search results page is dynamically modified to show at least a portion of the determined relevant attributes that correspond to the user and/or the user cluster; and outputting data for displaying a product overview page via the user interface for a selected product of the plurality of products, wherein the product overview page is dynamically modified to show the determined relevant attributes in an order that is based on the ranking of the relevant attributes, and wherein the data for displaying the product overview page includes a plurality of images for the selected product that are displayed in an order that is based on the ranking of the relevant attributes for the user and/or the user cluster.

2. The method of claim 1, wherein each of the plurality of images includes an embedded indication of attributes represented by the image, and wherein a primary image of the plurality of images displayed for the selected product in the search results page and the product overview page is selected as the primary image for the product responsive to a determination that the primary image represents the most and/or highest ranking attributes relative to other images for the selected product based on the embedded indication of attributes.

3. The method of claim 1, wherein the data for the search results page and/or the product overview page includes a subset of available customer reviews for the selected product, and wherein the subset of available customer reviews is selected for the selected product based on a correlation between the content of the subset of available customer reviews and the determined relevant attributes.

4. The method of claim 1, wherein the identification and ranking of the relevant attributes is based on the user's online shopping behavior, including user search queries, click patterns on like attributes, past purchase behavior, and explicit preferences supplied by the user.

5. The method of claim 1, wherein the search results page shows a top ranked attribute of the relevant attributes and wherein the product overview page shows each of the dynamically determined relevant attribute.

6. A system comprising:
a processor; and
memory storing instructions executable by the processor to dynamically determine content for a user interface for display, the instructions comprising:
instructions for receiving a search query from a user via a first page of the user interface;
instructions for identifying products corresponding to results of the search query;
instructions for dynamically identifying and ranking attributes of the products corresponding to results of the search query based on parameters of the search query and an identity of the user; and
instructions for generating a second page associated with the first page, the second page for displaying the products corresponding to the results of the search query, wherein one or more of an order or a placement of the identified and ranked attributes of the products in the second page is adjusted based on the parameters of the search query and the identity of the user.

7. The system of claim 6, wherein the second page includes one or more images for the selected result, and wherein the one or more images are displayed in an order based on a ranking of attributes represented by each of the one or more images.

8. The system of claim 7, wherein the attributes represented by each of the one or more images are identified by extracting embedded information in the images, the embedded information including an identification of attributes based on manual review of the images and/or an automated processing of optical character recognition of text in the images.

9. The system of claim 6, wherein the ranking of the attributes for the selected result is based on an explore-exploit continuous ranking algorithm used to determine a base ranking for products in a corresponding product category.

10. The system of claim 6, wherein the ranking of the attributes for the selected result is based on a bubble rank algorithm.

11. The system of claim 6, wherein each product on the second page has an associated product UI element, and wherein the instructions further comprise instructions for generating a third page responsive to selection of the product UI element for a selected product on the second page, wherein the third page shows additional identified and ranked attributes for the selected product relative to the second page, and wherein one or more of an order or a placement of the additional identified and ranked attributes of the products in the third page is adjusted based on the parameters of the search query and the identity of the user.

12. The system of claim 11, wherein the second and/or third pages further show customer reviews for the results of the search query, and wherein the customer reviews are ordered based on an association of each customer review with the dynamically identified and ranked attributes such that customer reviews determined to be associated with the dynamically identified and ranked attributes are highlighted for display.

13. The system of claim 6, wherein the identity of the user includes a past online shopping behavior of the user that is used to determine a user cluster to which the user belongs, and wherein the dynamically identified and ranked attributes are based on a base ranking of attributes for a product category relating to the search query for the user cluster.

14. A computer-implemented method, comprising:
identifying a base ranking of attributes for a product category based on a plurality of input signals including catalog data for the product category;
for each of a plurality of user clusters, adjusting the ranking of attributes for the product category for the user cluster based on user persona information associated with the user cluster;
responsive to receiving a search query from a user for a product in the product category, identifying a selected user cluster to which the user belongs; and
dynamically populating a user interface with product details for each of a plurality of search results for the search query, the product details including relevant attributes presented in an order that is based on the adjusted ranking for the selected user cluster.

15. The computer-implemented method of claim 14, wherein the product details include images for each of the plurality of search results, and wherein the images for each of the plurality of search results are ordered for display based on a determination of the respective number and ranking of the relevant attributes represented by the images.

16. The computer-implemented method of claim 14, wherein the product details include customer reviews for each of the plurality of search results, and wherein the customer reviews are ordered for display based on a determination of the respective number and ranking of the relevant attributes associated with the customer reviews.

17. The computer-implemented method of claim 14, wherein identifying a selected user cluster to which the user belongs is based on past user behavior and user demographic information.

18. The computer-implemented method of claim 14, wherein the base ranking is based on an online explore-exploit algorithm and/or a bubble ranking algorithm.

19. The computer-implemented method of claim 14, wherein populating the user interface with product details comprises populating a first field of the user interface with static information applicable to any search query and populating a second field of the user interface with the relevant attributes that are determined and ranked dynamically for the received search query.

20. The computer-implemented method of claim 14, wherein the base ranking utilizes a trained domain specific word embedding model.

* * * * *